(12) United States Patent
Smalls

(10) Patent No.: US 6,963,275 B2
(45) Date of Patent: Nov. 8, 2005

(54) PORTABLE WARNING LIGHT APPARATUS

(75) Inventor: Bryan H. Smalls, Columbia, SC (US)

(73) Assignee: NU-Tech Innovative Products, LLC, Columbia, SC (US)

( * ) Notice: Subject to any disclaimer, the term of this patent is extended or adjusted under 35 U.S.C. 154(b) by 94 days.

(21) Appl. No.: 10/449,579

(22) Filed: May 30, 2003

(65) Prior Publication Data
US 2003/0222791 A1 Dec. 4, 2003

Related U.S. Application Data

(60) Provisional application No. 60/384,508, filed on May 31, 2002.

(51) Int. Cl.$^7$ ................................................. B60Q 7/00
(52) U.S. Cl. ....................................... 340/473; 362/84
(58) Field of Search ................................ 340/473, 321, 340/432, 471, 908, 908.1; 315/82; 362/84, 362/145, 802

(56) References Cited

U.S. PATENT DOCUMENTS

| | | | | |
|---|---|---|---|---|
| 4,330,706 A | * | 5/1982 | Lawenhaupt | 250/214 AL |
| 5,005,004 A | * | 4/1991 | Udofot | 340/600 |
| 5,175,528 A | * | 12/1992 | Choi et al. | 340/331 |
| 5,914,651 A | | 6/1999 | Smalls | |
| 6,273,597 B1 | * | 8/2001 | Rolack | 362/542 |
| 6,275,149 B1 | * | 8/2001 | Tung | 340/473 |
| 6,422,714 B1 | * | 7/2002 | Hubbell | 362/84 |
| 6,707,389 B2 | * | 3/2004 | Pederson | 340/815.45 |
| 6,798,354 B2 | * | 9/2004 | Schuessler | 340/901 |

* cited by examiner

Primary Examiner—John Tweel, Jr.
(74) Attorney, Agent, or Firm—Sara A. Centioni; Nexsen Pruet, LLC

(57) ABSTRACT

A flashing warning light apparatus (10) for warning motorists in oncoming traffic that an object such as a car is stopped near the highway ahead. The apparatus (10) includes a housing (24) with an array of lights (12) on the front and possibly also the rear faces. Sensors (14) front and back sense oncoming traffic. A switch (36) allows the user to cause the arrays of lights (12) to flash continuously or only when oncoming traffic is sensed. The device may be powered by the car battery through a cigarette lighter adapter (34), dry cell batteries (28) or a solar cell (44).

18 Claims, 4 Drawing Sheets

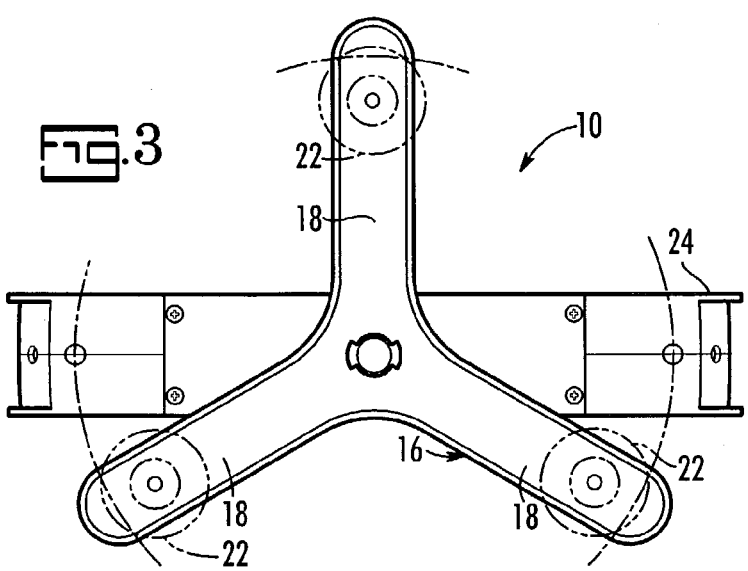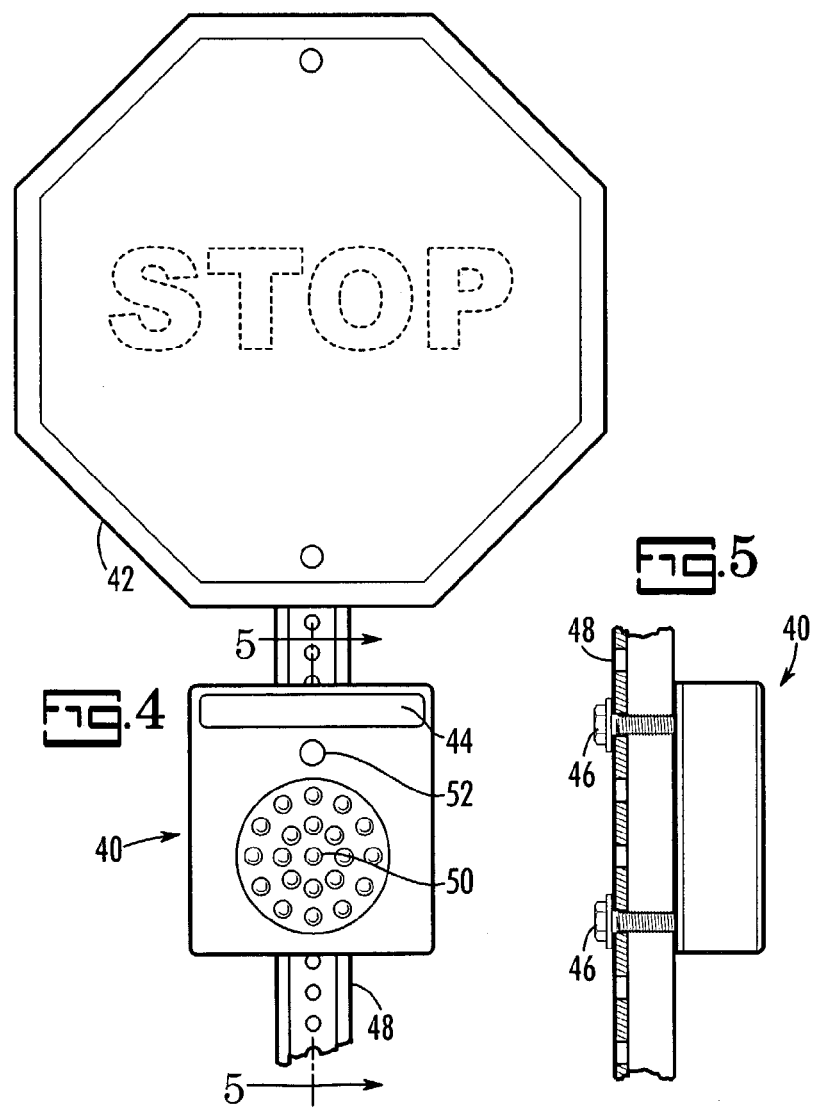

PORTABLE WARNING LIGHT APPARATUS

CROSS REFERENCE TO RELATED APPLICATIONS

The benefit of the filing of U.S. provisional patent application Ser. No. 60/384,508 filed May 31, 2002 is claimed.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates to vehicle warning or emergency flasher devices and more particularly pertains to a new vehicle safety emergency flasher apparatus that automatically operates a flashing light system within, or in the vicinity of, a vehicle or other potential hazard to motorists in oncoming traffic by sensing when there is a vehicle approaching and, thereby, providing added safety and protection for users of the apparatus and for oncoming motorists while being designed to have low-power consumption in order to conserve the charge within the device's dry cell batteries or the vehicle's battery.

The use of vehicle emergency flasher devices is known in the prior art. More specifically, and notwithstanding the myriad of designs encompassed by the crowded prior art, which devices have been developed for the fulfillment of countless objectives and requirements, vehicle emergency flasher devices heretofore devised and utilized are known to consist basically of familiar, expected and obvious structural configurations. Known prior art vehicle emergency flasher devices include U.S. Pat. Nos. 5,914,651, 5,255,164; 5,103,383; 4,751,494; 3,908,179; 4,893,111 and U.S. Design Pat. No. 254,298.

While these devices fulfill their respective, particular objectives and requirements, the aforementioned patents do not disclose the new vehicle safety emergency flasher apparatus. The inventive device is comprised of a housing and base, at least one light sensor electrically coupled to light emitting devices, multiple power sources and/or power cords and/or adapters, and a control switch.

In these respects, the vehicle safety emergency flasher assembly, according to the present invention, substantially departs from the conventional concepts and designs of the prior art, and in so doing provides an apparatus primarily developed for the purpose of automatically operating a flashing light system within, or in the vicinity of, a vehicle by sensing when there is an approaching vehicle thereby offering protection for the user of the device, the user's vehicle, and oncoming drivers and their vehicles while conserving the charge within the battery of the vehicle in which the present invention is being used (when it is being powered by the user's vehicle).

BRIEF SUMMARY OF THE INVENTION

In view of the foregoing disadvantages inherent in the known types of vehicle emergency flasher devices now present in the prior art, the present invention provides a new vehicle safety emergency flasher assembly wherein the same can be utilized for automatically operating a flashing light system within, or in the vicinity of, a vehicle by sensing when there is another approaching vehicle thereby offering protection for the user of the device, the user's vehicle, and oncoming drivers and their vehicles while conserving the charge within the battery of the vehicle in which the present invention is being used (when it is being powered by the user's vehicle).

The general purpose of the present invention, which will be described subsequently in greater detail, is to provide a new vehicle safety emergency flasher apparatus and method which has many of the advantages of the vehicle emergency flasher devices mentioned heretofore and many novel features that result in a vehicle safety emergency flasher apparatus which is not anticipated, rendered obvious, suggested, or even implied by any of the prior art vehicle emergency flasher devices, either alone or in any combination thereof.

To attain this, the present invention generally comprises a housing and base, at least one light sensor electrically coupled to light emitting devices, multiple power sources via power cords and/or adapters and a control switch.

The present invention has several advantages over the prior art conventional hazard system including, but not being limited to, a novel battery life conservation design. Generally, when a vehicle becomes disabled, it is common to activate the vehicle's "conventional hazard flasher system," which generally consists of two front and two rear hazard lights (incandescent) flashing at the same time. Unfortunately, the continual flashing of a conventional hazard system quickly drains the roadside vehicle's battery, making the eventually flasher-less roadside vehicle more of a roadside hazard, especially during unfavorable weather conditions or along dark highways. Moreover, not only do these battery-depleted conventional hazard systems of the prior art no longer serve their purpose of alerting oncoming traffic of the possible dangers posed by an unattended or abandoned roadside vehicle, the depleted battery of a roadside vehicle becomes more of a burden and an added expense when the vehicle's owner returns to retrieve or repair the disabled vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the scope of the present invention including, but not limited to, that which is encompassed by the claims be regarded as including such equivalent constructions insofar as such constructions do not depart from the spirit and scope of the present invention.

It is therefore a feature of the present invention in that it provides a new vehicle safety emergency flasher apparatus and method which has many of the advantages of the vehicle emergency flasher devices mentioned heretofore and many novel features that result in a the new vehicle safety emergency flasher apparatus of the present application, which is not anticipated, rendered obvious, suggested, or even implied by any of the prior art vehicle emergency flasher devices, either alone or in any combination thereof.

It is another feature of the present invention in that it provides a new vehicle safety emergency flasher apparatus that may be easily and efficiently manufactured and marketed.

It is a further feature of the present invention in that it provides a new vehicle safety emergency flasher apparatus that is of a durable and reliable construction.

An even further feature of the present invention is that it provides a new vehicle safety emergency flasher apparatus which is susceptible of a low cost of manufacture with regard to both materials and labor, and which accordingly is then susceptible of low prices of sale to the consuming public, thereby making such vehicle safety emergency flasher apparatus economically available to the buying public.

Still yet another feature of the present invention is that it provides a new vehicle safety emergency flasher apparatus, that provides in the apparatuses and methods of the prior art some of the advantages thereof, while simultaneously overcoming some of the disadvantages normally associated therewith.

Still another feature of the present invention is that it provides a new vehicle safety emergency flasher apparatus for automatically operating a flashing light system within, or in the vicinity of, a vehicle by sensing when there is another approaching vehicle thereby offering protection for the user of the device, the user's vehicle, and oncoming drivers and their vehicles while conserving the charge within the battery of the vehicle in which the present invention is being used (when it is being powered by the user's vehicle).

Yet another feature of the present invention is its provision of a new vehicle safety emergency flasher apparatus that is comprised of a housing and a base, at least one light sensor electrically coupled to a light source, multiple alternate power sources via power cords and/or adapters, and a control switch.

Still yet another feature of the present invention is that it also provides a new vehicle safety emergency flasher apparatus that forewarns oncoming traffic that a disabled, or an otherwise non-moving, vehicle or object exists near the road.

Even still another feature of the present invention is that it provides a new vehicle safety emergency flasher device that may only operate upon detection of an approaching vehicle, thereby saving the charge within the battery of a vehicle.

Together with the other advantages and benefits provided by the invention, along with the various features of novelty which characterize the invention, and which are pointed out with particularity as described herein, for a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWINGS

FIG. 3 is bottom view of the warning light apparatus of FIG. 1 showing the base, according to a preferred embodiment of the present invention.

FIG. 4 is front view of an alternate embodiment of a warning light apparatus, according to a preferred embodiment of the present invention.

FIG. 5 is a detailed, side view of the alternate embodiment of the warning light apparatus of FIG. 4, according to a preferred embodiment of present invention.

DESCRIPTION OF THE PREFERRED EMBODIMENT

Motorists taking pausing to rest along side a highway or to change a tire, or because of other emergencies or other roadside activities, are often required to park their vehicles, and they may do so without using their vehicle's conventional hazard system. Oftentimes because they fear that using their hazard system would deplete their vehicle's battery, leaving them stranded. So they take a chance of not using their conventional hazard system's flashers over their own personal safety. The present invention is a new, improved flashing warning light apparatus that minimizes these issues. The light of the present invention allows those motorists pausing alongside a highway, or those who are engaged in other roadside activities or emergencies, to alert oncoming traffic of their presence without having to fear that they are depleting their vehicle's battery.

The warning light's features and advantages may prove to be very useful for alerting oncoming traffic of possible dangers posed by drivers or occupants of vehicles, such as the following: (1) occupants of roadside vehicles who are awaiting help following vehicular breakdown or tire changes, for example, who are not using their hazard lights for the fear of battery depletion; (2) unoccupied, unattended, or abandoned roadside vehicles left overnight, or for extended periods of time; (3) recreational vehicles, long haul truckers and/or 18 wheelers parked along the roadside overnight or for an extended period of time; (4) vehicles parked along highways at night, during sporting events, social gatherings, and special events; (5) vehicles involved in highway accidents (that because of their location on or along the roadway may endanger oncoming traffic); (6) vehicles broken down in the direct path of oncoming traffic; (7) all roadside vehicles during bad weather, snow, fog, etc.; (8) maintenance vehicles and crews working along highways; (9) vehicles stopped in inconspicuous places, such as over hills and around curves; and (10) train crossings. The present warning light can also be attached to highway signs or barriers when those signs and barriers are not easily anticipated such as along dark, winding roads and near curves in the road to help drivers of oncoming cars pay appropriate attention to the sign.

Figure 1:
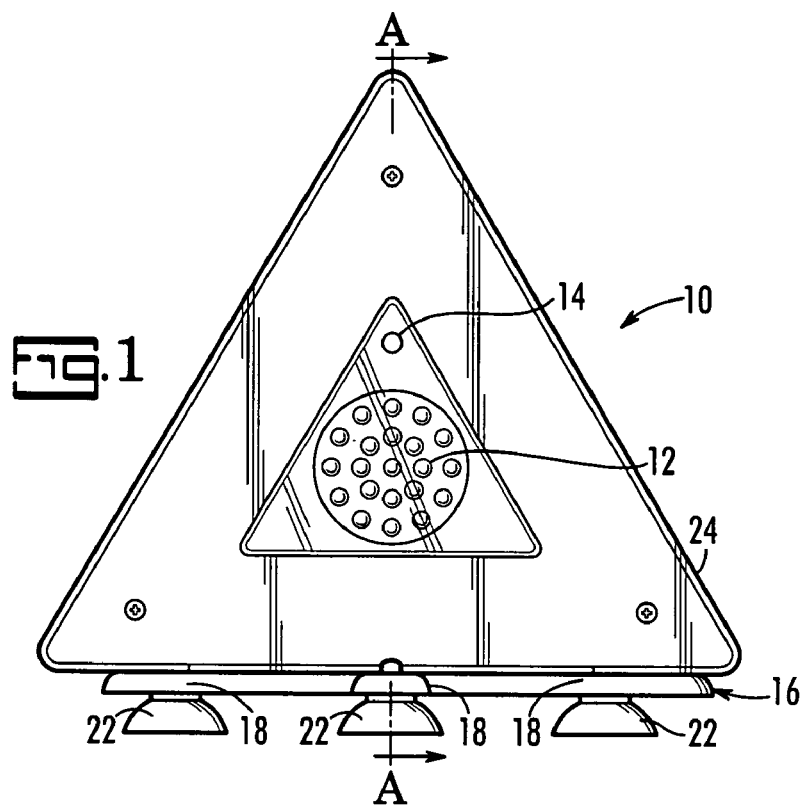
FIG. 1 is a front view of a warning light apparatus, according to a preferred embodiment of the present invention.
Figure 2:
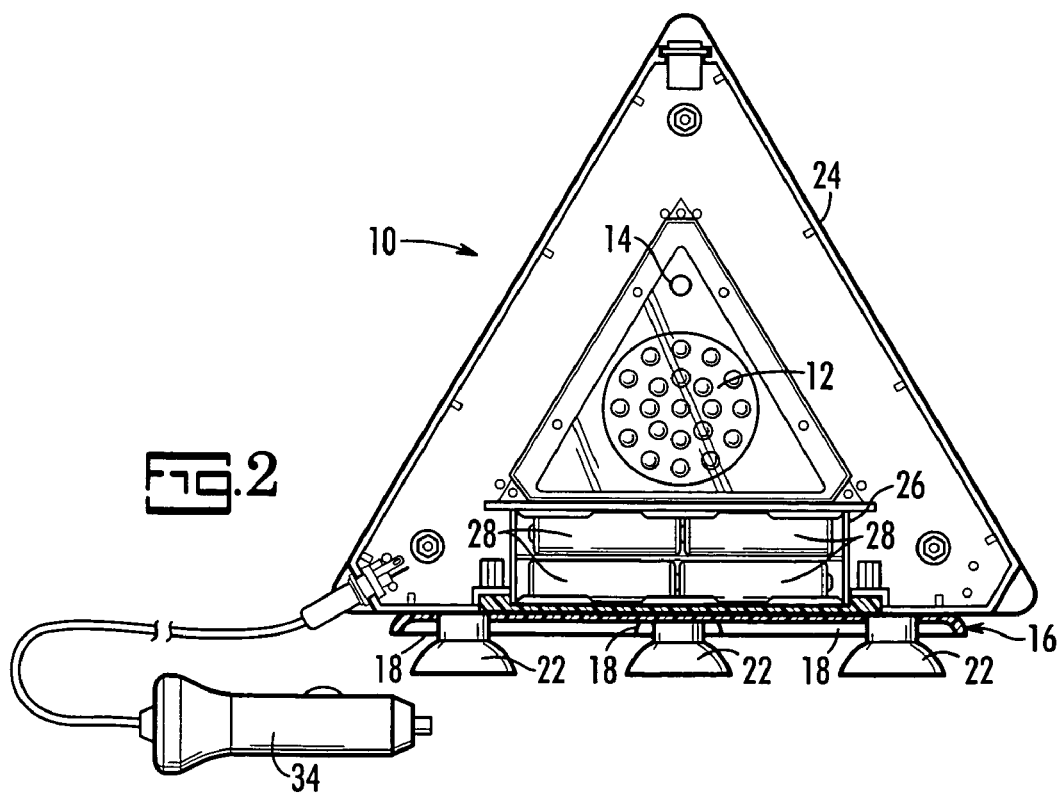
FIG. 2 is an interior view of the warning light apparatus of FIG. 1, according to a preferred embodiment of the present invention.

With reference now to the drawings, and in particular to FIGS. 1–3, a warning light embodying the principles and concepts of the present invention and generally designated by the reference numeral 10 will be described. FIG. 1 shows an exterior front view of warning light 10; the rear view of warning light 10 is preferably the same as the front view.

More specifically, it will be noted that the warning light 10 carries arrays of lights 12 such as light emitting diodes (LEDs) or low wattage halogen lamps, in the center of its front and rear faces. However, it is contemplated by the present invention that a wide variety of arrays of lights 12 not limited to LEDs and halogen lamps can be employed. Arrays 12 are preferably a large enough array, such as, for example, to include at least 20 LEDs. Each array 12 should be large enough and bright enough to be seen by oncoming traffic from a suitable stopping distance away, preferably at least 400 feet. One array 12 is visible from the front of warning light 10 and one is visible from the rear of warning light 10. Above each array 12 is a light sensor 14 that detects the headlights of oncoming vehicular traffic. One sensor 14 faces forward from the front face of warning light 10 and one faces rearward from the rear face of warning light 10.

To facilitate attachment of warning light 10 to a surface, such as the top, the hood, or the trunk lid of a vehicle, or even its side, warning light 10 has a base 16 with three legs 18 (best seen in FIG. 3), each of which has a suction cup 22 or a magnet capable of supporting the weight of warning light 10 when stuck to a clean, smooth or metallic surface.

Inside a housing 24 of warning light 10, as best seen in FIG. 2, is a battery box 26 dimensioned to hold a suitable number of standard-sized dry cell batteries, solar-celled batteries, or dry-celled batteries charged by solar-celled batteries, that produce the requisite voltage to operate an array for many hours. These batteries may be any size and number, such as D, C, AA or AAA, or any variation of solar-cells, but preferably, box 26 is dimensioned to house eight AA batteries 28 in series to generate an electrical potential of 12 volts DC. The duration of warning light will of course vary based on the type of battery, with alkaline or lithium batteries lasting longer than more conventional batteries.

In addition to being adapted to operate from batteries, warning light 10 may be operated from the 12 volt car battery through the cigarette lighter when equipped with a cigarette lighter adapter 34, as shown in FIG. 2. Preferably, warning light 10 will drain current from both sources beginning with batteries 28 and then the car battery.

When connected to the vehicle's cigarette lighter via adapter 34, or when battery box 26 has a supply of fresh batteries 28, warning light 10 may operate in one of two modes, depending on the selection of the user. The user indicates his or her selection using the positions of a three-way switch 36. Both the front and rear arrays 12 operate independently of each other but are powered by the same sources, either batteries 28 in battery box 26 or via the car cigarette lighter adaptor 34. In a first position, switch 36 is OFF; in either of the other two positions, it is ON. One of the ON positions will result in array 12 flashing intermittently but continuously until either switched to the OFF position or to the other ON position.

In the other ON position, array 12 will flash whenever sensor 14 senses oncoming traffic at night. Sensor is preferably a light sensor such as a cadmium sulfide photocell, but alternatively, may be a motion sensor, a radar sensor, a sonic sensor, or an infrared sensor. The type of sensor would dictate what was sensed, such as object speed, a hot engine, or a moving object. Specifically, the headlights of oncoming traffic will be sensed and initiate a series of flashes of sufficient duration, preferably about ten seconds, to alert the drivers in the oncoming vehicle of the existence of potential a roadside hazard until the vehicle passes. Thereafter, array 12 will not flash until the next oncoming vehicle is sensed.

Preferably housing 24 and base 16 are made of plastic by injection molding and either colored or covered in a bright color, such as orange or yellow, and most preferably fluorescent colors.

FIGS. 4 and 5 illustrate an alternative embodiment of the present invention for an alternative use. FIGS. 4 and 5 show a warning light 40 in use attached to an object in order to call a motorist's attention to the object. Here, the object is a traffic sign 42. Other objects could include highway barriers and road obstructions. For example, a country road may have an intersection at the end of a short, sharp curve. A warning sign of an intersection placed in advance of that intersection warns of the intersection ahead but a motorist may miss that sign. Having warning light 40 flash when the headlights of the motorist's car strike it will increase the likelihood that the motorist will see the warning sign and heed it.

Because warning light 40 cannot be powered by batteries indefinitely, the batteries must be chargeable using electric solar cells 44 during daylight so that it can operate throughout the night from the recharged internal batteries. Preferably tamper-resistant bolts 46 can be used to fasten warning light 40 to the post 48 that holds the traffic sign 42 so that vandals cannot easily remove warning light 40. LED array 50 and sensor 52 may be carried only on the front of warning light 40 when it is attached to a traffic sign 42.

Figure 6:
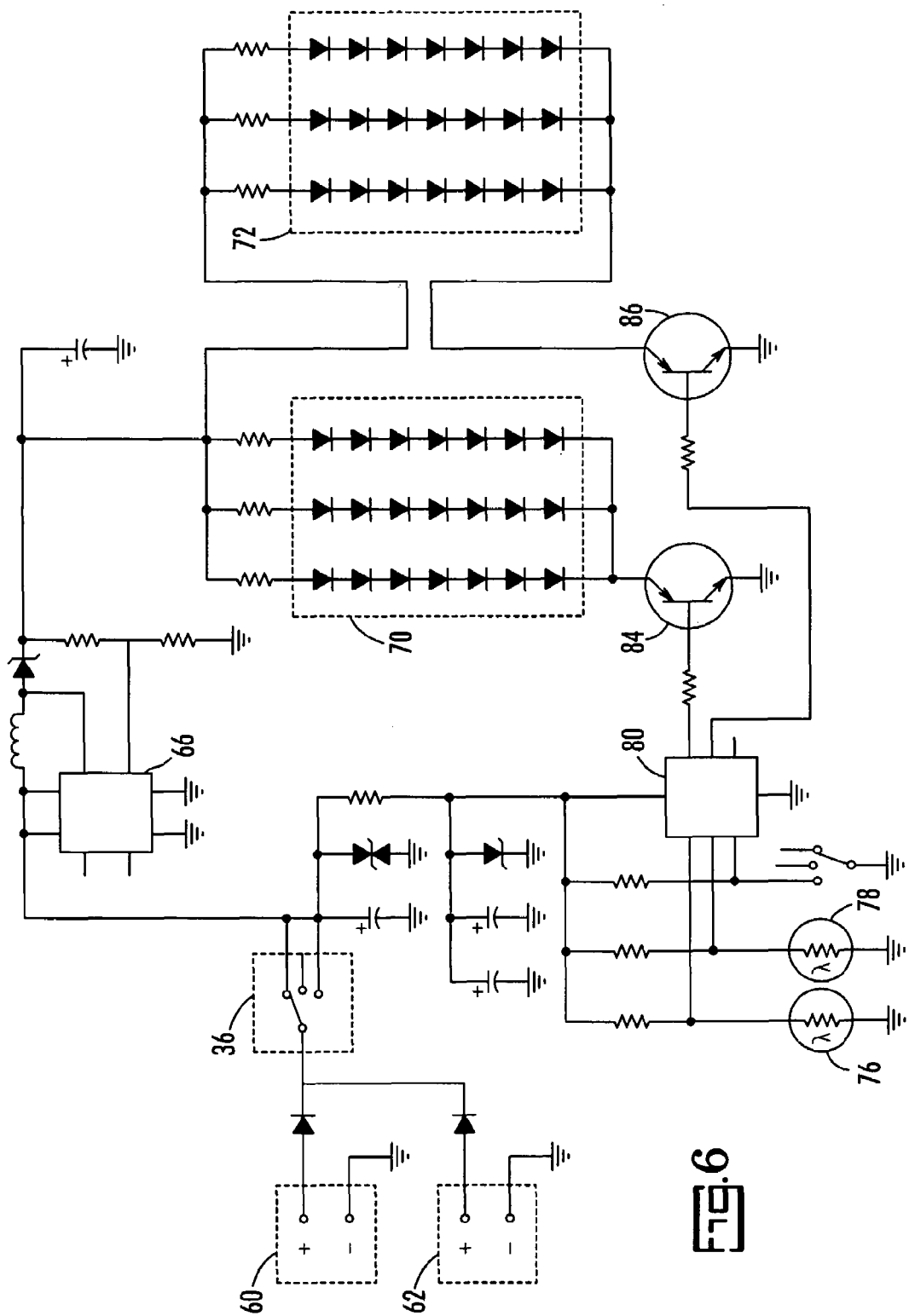
FIG. 6 is an electrical schematic diagram of a warning light apparatus, according to a preferred embodiment of the present invention.

There are a number of ways to configure the electric circuitry of the present invention that will be readily apparent to those skilled in electrical circuit design. FIG. 6 illustrates one of them. Power is provided by either the 12 Volt DC car battery 60 or a set 62 of eight 1.5-volt dry cell batteries in the warning light housing arranged electrically in series to generate 12 volts.

Switch 36 is used to select from among the first ON position (flashing continuously), the OFF position and the second ON position (flashing for a limited period of time in response to a signal). A flash controller 66 causes the flashing of two LED arrays 70, 72, for the front and back, respectively.

Two sensors, 76 and 78, one on the front and one on the back of warning light 10, are connected to LED arrays 70 and 72, respectively, via a sensor controller 80 to the gates of transistors 84, 86, respectively.

Figure 7:
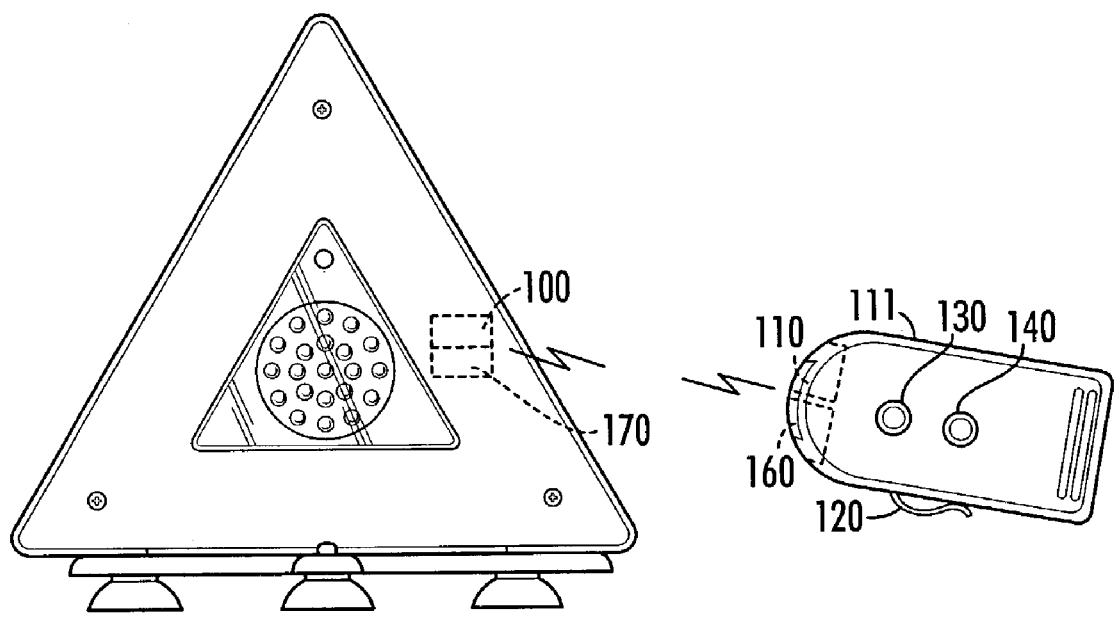
FIG. 7 is a perspective view of a warning light apparatus, according to a preferred alternative embodiment of the present invention.

Improvements in the present invention can be made that will expand its role in accident prevention. For example, in addition to a visible flashing signal, the present device can issue an audible signal or, if the oncoming vehicle is suitably equipped, a radio frequency, microwave or digital signal can be transmitted for detection by a receiver in the oncoming vehicle to alert the driver of the oncoming vehicle that he or she is approaching a stopped vehicle. As shown in FIG. 7, a preferred alternative embodiment of the present invention includes a first transmitter 100 that is housed by warning light 10. First transmitter 100 is capable of transmitting signals, such as radio or microwave, that are detected by first receiver 110 that is housed by a receiver unit 111, which may be located in the oncoming vehicle and can be clipped to the sun visor by a clip 120. Receiver unit 110 can be operated by an on/off switch 140 and contains an audible warning device in the form of a playback module 130 that audibly warns the passengers in the oncoming vehicle when they are approaching the warning light 10. Alternatively, receiver unit 110 may include a chime 150 (not shown) for warning oncoming vehicles. Receiver unit 110 further includes a second transmitter 160 that is capable of transmitting signals that are detected by a second receiver 170 housed by warning light 10. Upon receiving such signal, second receiver 170 activates array 12. Transmitter 100 and receiver unit 110 preferably communicate back and forth through built in antennae. Preferably, the audible warning occurs when the oncoming vehicle is approximately 1000 feet from warning light 10; however, other distances are contemplated depending on the distance required to safely and effectively warn oncoming traffic. In operation, first transmitter 100 sends a signal to first receiver 110, which activates an audible warning within the cabin of an oncoming vehicle. Thereafter, second transmitter 160 sends a signal to second receiver 170 to activate the array 12. Therefore, the oncoming car is warned by a combination of audible warning and visible warning. This transmitter/receiver system may also be employed at train crossings so that an oncoming vehicle can be warned both audibly and visibly by warning light 10 at a train crossing when a train is approaching. While these embodiments can be added to a vehicle after purchase, they are better incorporated into the vehicle during manufacture.

Figure 8:
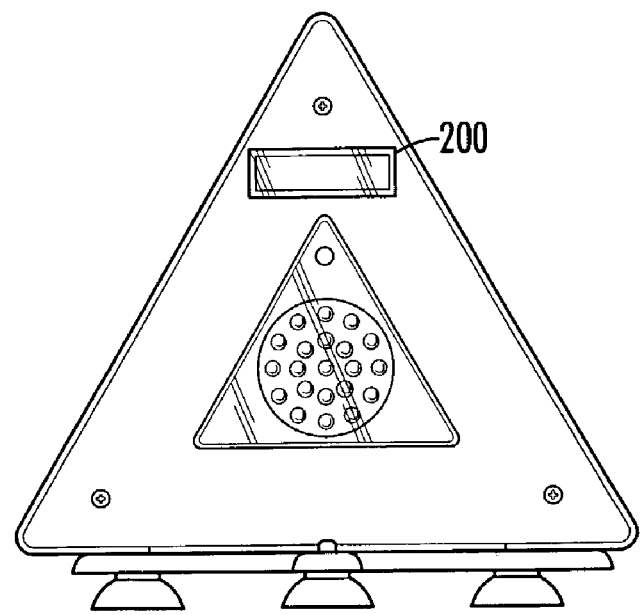
FIG. 8 is a perspective view of a warning light apparatus, according to a preferred alternative embodiment of the present invention.

As shown in FIG. 8, another improvement can include the use of a reflector 200 on warning light 10 housing so that oncoming vehicles are not only warned by array 13, but also by the reflection of the headlights off of reflector 200.

The manner of usage and operation of the present invention, the same should be apparent from the above description. Accordingly, no further discussion relating to the manner of usage and operation will be provided. With respect to the above description, it is to be realized that the optimum dimensional relationships for the parts of the invention, and variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for warning motorists, said apparatus comprising:
    a housing having a front and a rear face;
    a first array of lights carried by front face of said housing;
    a second array of lights carried by said rear face of said housing;
    a first sensor carried by said front face of said housing and in electrical connection with said first array;
    a second sensor carried by said rear face of said housing and in electrical connection with said second array;
    a power source for providing electrical power to said first and said second arrays and said first and said second sensors, said first sensor causing said first array to flash, said second sensor causing said second array to flash.

2. The apparatus as recited in claim 1, wherein said first and second sensors are light sensors.

3. The apparatus as recited in claim 2, wherein said light sensors are each a cadmium sulfide photocell.

4. The apparatus as recited in claim 2, wherein said light sensors detect light from a distance of approximately 400 feet.

5. The apparatus as recited in claim 1, wherein said first array of and said second array of lights are selected from the group consisting of an array of light emitting diodes and an array of low-wattage halogen lamps.

6. The apparatus as recited in claim 1, wherein said housing is fluorescent.

7. The apparatus as recited in claim 1, wherein said power source is a battery.

8. The apparatus as recited in claim 1, further comprising a base adapted to be securable to a vehicle.

9. The apparatus as recited in claim 1, wherein said power source is a solar cell.

10. The apparatus as recited in claim 1, further comprising a reflector carried by said housing.

11. The apparatus as recited in claim 1, further comprising a switch having a first on position in which said first and said second arrays flash continuously and a second on position in which said first and said second arrays flash in response to said first and said second sensors.

12. The apparatus as recited in claim 1, further comprising a cigarette lighter adaptor for connection of said apparatus to said power source.

13. The apparatus as recited in claim 1, further comprising a base having legs.

14. The apparatus as recited in claim 13, wherein said legs carry suction cups.

15. The device as recited in claim 1, wherein said first and said second sensors are selected from the group consisting of light sensors, motion sensors, radar sensors, sonic sensors, and infrared sensors.

16. An apparatus for warning motorists, said apparatus comprising:
    a housing;
    a sensor carried by said housing;
    a first transmitter carried by said housing;
    an array of lights responsive to said sensor;
    a power source for providing electrical power to said array of lights;
    a switch to connect said power source to said array of lights and said sensor;
    a receiver unit;
    a first receiver carried by said receiver unit that is capable of receiving signals from said first transmitter;
    a second transmitter that is carried by said receiver unit; and
    a second receiver that is carried by said housing and is capable of receiving signals from said second transmitter, wherein said array of lights is responsive to said second receiver.

17. The apparatus as recited in claim 16, wherein said receiver unit includes an audible warning device.

18. The apparatus as recited in claim 17, wherein said audible warning device is activated by said first receiver.

* * * * *